US012455687B1

(12) United States Patent
Martin et al.

(10) Patent No.: US 12,455,687 B1
(45) Date of Patent: Oct. 28, 2025

(54) DYNAMIC PERFORMANCE OPTIMIZATION IN STORAGE ARRAYS

(71) Applicant: Dell Products L.P., Round Rock, TX (US)

(72) Inventors: Owen Martin, Hopedale, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/779,148

(22) Filed: Jul. 22, 2024

(51) Int. Cl.
*G06F 3/06* (2006.01)

(52) U.S. Cl.
CPC ............ *G06F 3/061* (2013.01); *G06F 3/0631* (2013.01); *G06F 3/0679* (2013.01)

(58) Field of Classification Search
CPC ....... G06F 3/0631; G06F 3/061; G06F 3/0679
USPC .......................................................... 711/154
See application file for complete search history.

(56) References Cited

U.S. PATENT DOCUMENTS

| | | | |
|---|---|---|---|
| 2011/0219208 A1* | 9/2011 | Asaad ...................... | G06F 9/06 712/12 |
| 2023/0083701 A1* | 3/2023 | Wang .................. | G06F 11/3433 718/1 |
| 2023/0334047 A1* | 10/2023 | Zhang ............... | G06F 16/24542 |
| 2024/0119614 A1* | 4/2024 | Ebrahimi Afrouzi ........................ | A47L 11/4011 |
| 2024/0393777 A1* | 11/2024 | Yang .................. | G05B 23/0254 |

* cited by examiner

*Primary Examiner* — Than Nguyen
(74) *Attorney, Agent, or Firm* — Krishnendu Gupta; Nikhil Patel

(57) ABSTRACT

One or more aspects of the present disclosure relate to dynamic performance optimization in storage arrays using tracelet matrices. In embodiments, one or more input/output (IO) operations are received by a storage array. Code path branches taken by each IO operation across storage array components are recorded in a bitmap matrix. Additionally, the likelihood of different code path branches being taken by each IO operation at a storage device or storage group level is forecasted using each IO operation's corresponding bitmap matrix. Performance bottlenecks corresponding to the one or more IO operations are also identified based on a comparison of each IO operation's bitmap matrix and a forecast of the likelihood of the different code path branches being taken by each IO operation targeting a subject storage device or storage group. Further, storage array resources and configurations are dynamically adjusted to resolve the identified performance bottlenecks.

20 Claims, 7 Drawing Sheets

DYNAMIC PERFORMANCE OPTIMIZATION IN STORAGE ARRAYS

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/withdrawals. In addition, storage arrays can include a central management system (CMS) that plays a crucial role in managing the data and delivering one or more distributed storage services for an organization. The CMS, which can include one or more processors, is responsible for performing data storage services.

SUMMARY

One or more aspects of the present disclosure relate to dynamic performance optimization in storage arrays using tracelet matrices. In embodiments, one or more input/output (IO) operations are received by a storage array. Code path branches taken by each IO operation across storage array components are recorded in a bitmap matrix. Additionally, the likelihood of different code path branches being taken by each IO operation at a storage device or storage group level is forecasted using each IO operation's corresponding bitmap matrix. Performance bottlenecks corresponding to the one or more IO operations are also identified based on a comparison of each IO operation's bitmap matrix and a forecast of the likelihood of the different code path branches being taken by each IO operation targeting a subject storage device or storage group. Further, storage array resources and configurations are dynamically adjusted to resolve the identified performance bottlenecks.

In embodiments, each bit in the bitmap matrix can be linked with data describing a distributed event corresponding to a portion of a code path branch taken by each IO operation.

In embodiments, a probability matrix for each storage device or storage group of the storage array can be generated using the forecasted likelihood of the different code path branches being taken by each IO operation.

In embodiments, each cell of the probability matrix can be associated with at least a portion of a code path branch. Additionally, each cell can be provided with a probability corresponding to a future IO operation using the at least the portion of the code path branch.

In embodiments, a tracelet score for each probability matrix can be generated based on a sum of each cell's probability in each probability matrix.

In embodiments, the tracelet score can be compared against one or more performance thresholds. Further, the performance bottleneck can be identified based on the comparison.

In embodiments, each probability matrix can be associated with a configuration file corresponding to the storage array. The configuration file can identify hardware and logical resources equipped by the storage array.

In embodiments, performance metrics of the storage array based on different IO workloads and storage array configurations can be predicted using lab-based and field-deployed storage arrays by collecting probability matrix, performance, and configuration data from the lab-based and field-deployed storage arrays.

In embodiments, one or more cells of the probability matrix can be masked for each storage device or storage group based on a relative importance of the one or more cells.

In embodiments, upgrade recommendations for the storage array can be generated based on the probability matrix for each storage device or storage group. For example, the upgrade recommendations can include options categorized into low, medium, and high cost based on a cost factor and performance impact associated with each recommendation.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
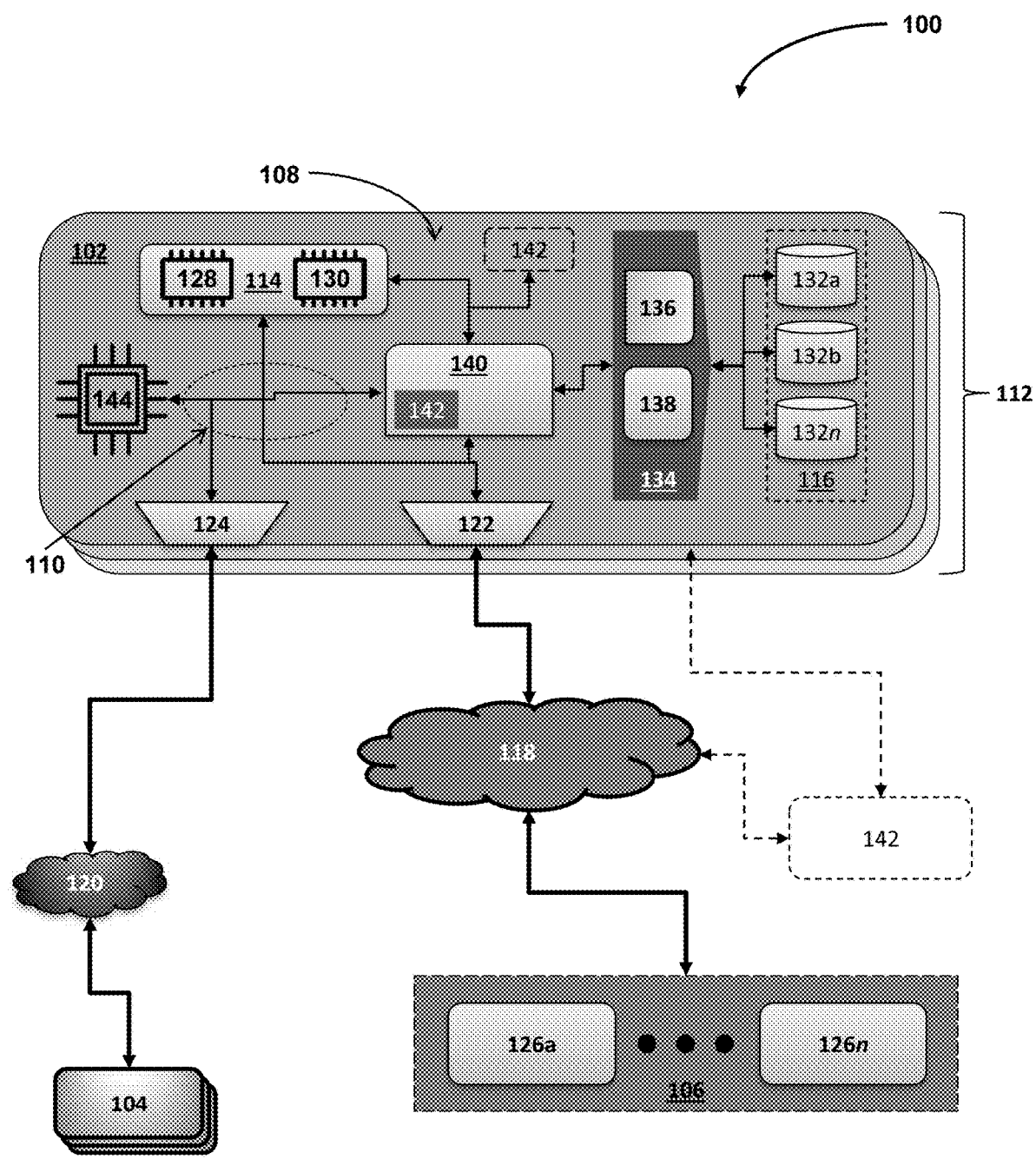
FIG. 1 illustrates a distributed network environment in accordance with embodiments of the present disclosure.

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Modern storage arrays are complex systems comprising multiple components that handle vast amounts of input/output (IO) operations. These operations traverse various paths through the storage array's architecture, including emulations, caching, data services, and disk layers.

Identifying and mitigating performance bottlenecks in traditional storage systems is challenging due to the dynamic nature of IO operations and the diverse configurations of storage arrays. Performance issues may arise from numerous factors, including inefficient path utilization, resource contention, and suboptimal configuration settings. Typically, addressing these issues involves manual intervention by subject matter experts (SMEs), which can be time-consuming and error-prone.

Furthermore, existing systems often rely on static or semi-static models that do not adequately adapt to the changing patterns of IO operations, leading to sub-optimal performance and increased operational costs. Therefore, there is a need for an automated, intelligent system capable of dynamically analyzing and adjusting storage array configurations to optimize performance in real time.

Embodiments of the present disclosure integrate detailed IO path modeling with real-time data analysis and predictive techniques to provide a proactive, automated, and finely tuned approach to storage array management, significantly enhancing performance and operational efficiency.

The embodiments can manage and optimize storage array performance using "Tracelets." For example, the embodiments can employ a detailed bitmap matrix, known as a P-matrix, to record and analyze the code path branches taken by each input/output (IO) operation across various storage array components. The P-matrix helps identify distributed events and is crucial for diagnosing and forecasting performance issues, as described in greater detail herein.

Using the data from the P-matrix, the embodiments can forecast potential code path branches for future IO operations at both device and storage group levels. This predictive capability allows for the early identification of performance bottlenecks. The embodiments dynamically adjust storage resources and configurations to mitigate these bottlenecks effectively.

Additionally, the embodiments can use a probability matrix for each storage device or group, which assigns probabilities to potential code paths, aiding in calculating a tracelet score. This score is instrumental in comparing performance across different scenarios and identifying critical issues.

The embodiments also generate upgrade recommendations based on the analysis, categorized by cost and potential impact, allowing for cost-effective and performance-optimized upgrades. These recommendations are supported by a configuration file that details the hardware and logical resources of the storage array, enhancing the precision of each embodiment's predictive models.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
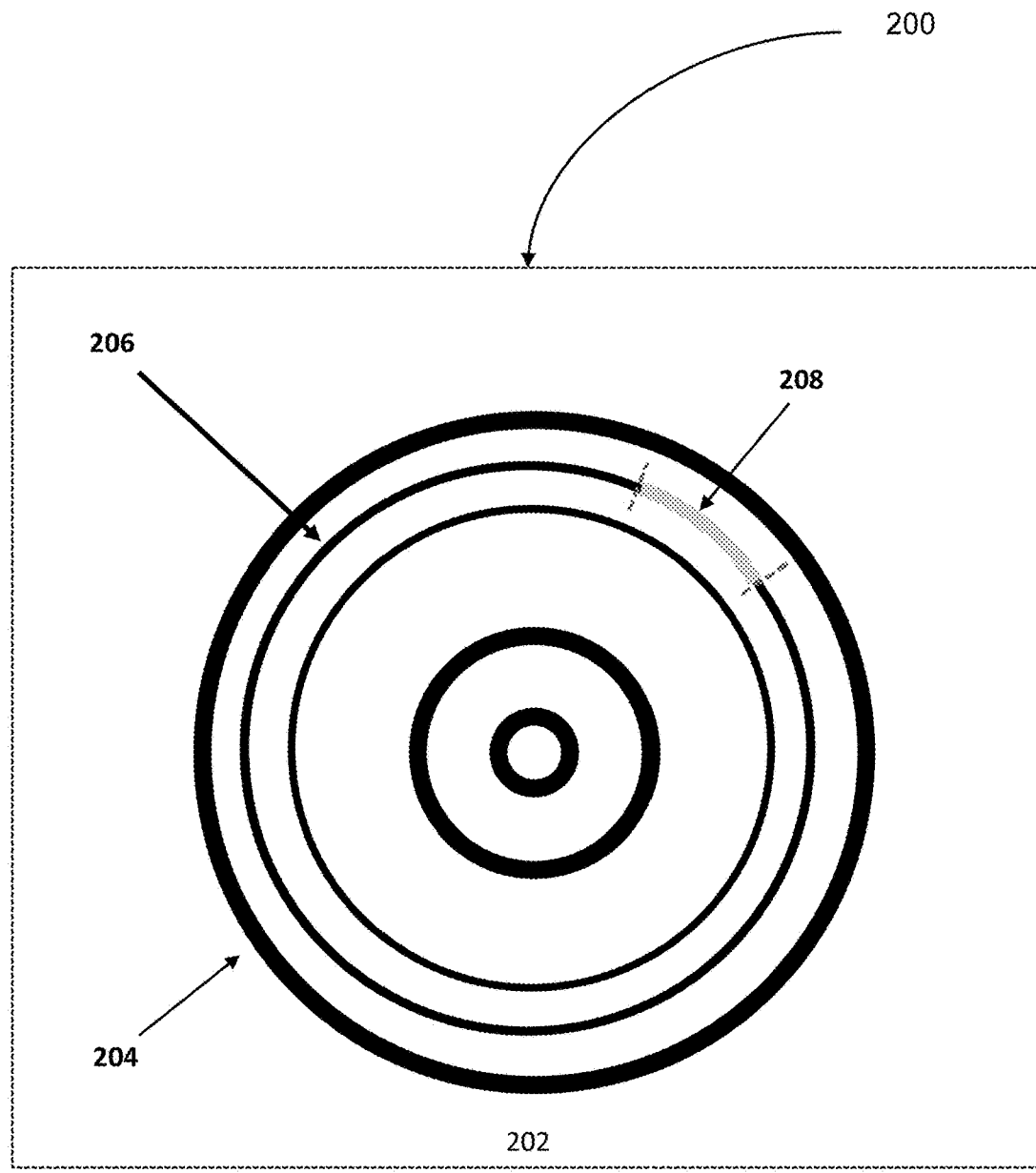
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-n. For example, the EDS 140 can provide a host, e.g., client machine 126a, with a virtual storage device (e.g., thin-device (TDEV)) that logically represents zero or more portions of each storage device 132a-n. For example, the EDS 140 can establish a logical track using zero or more physical address spaces from each storage device 132a-n. Specifically, the EDS 140 can establish a continuous set of logical block addresses (LBA) using physical address spaces from the storage devices 132a-n. Thus, each (LBA) represents a corresponding physical address space from one of the storage devices 132a-n. For example, a track can include 256 LBAs, amounting to 128 kb of physical storage space. Further, the EDS 140 can establish the TDEV using several tracks based on a desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

As part of the SLA, the SLO specifies service level (SL) tiers corresponding to each performance metric range and categories of data importance. This adaptability allows the SLA to map critical data types to an SL tier requiring the fastest response time. Consequently, the storage array 102 can allocate the array's memory/storage resources based on an IO workload's anticipated volume of IO messages associated with each SL tier and the memory hierarchy. This adaptability ensures the system can handle workloads and data types effectively.

For instance, the EDS 140 can establish the hierarchy to include one or more tiers (e.g., subsets of the array's storage and memory) with similar performance capabilities (e.g., response times and uptimes). The EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Here, 'fast' refers to memory 114 and persistent storage 116 with relative performance capabilities exceeding a first threshold, while 'slow' refers to memory 114 and persistent storage 116 with relative performance capabilities falling below a second threshold. Notably, the first and second thresholds can correspond to the same threshold.

Figure 3:
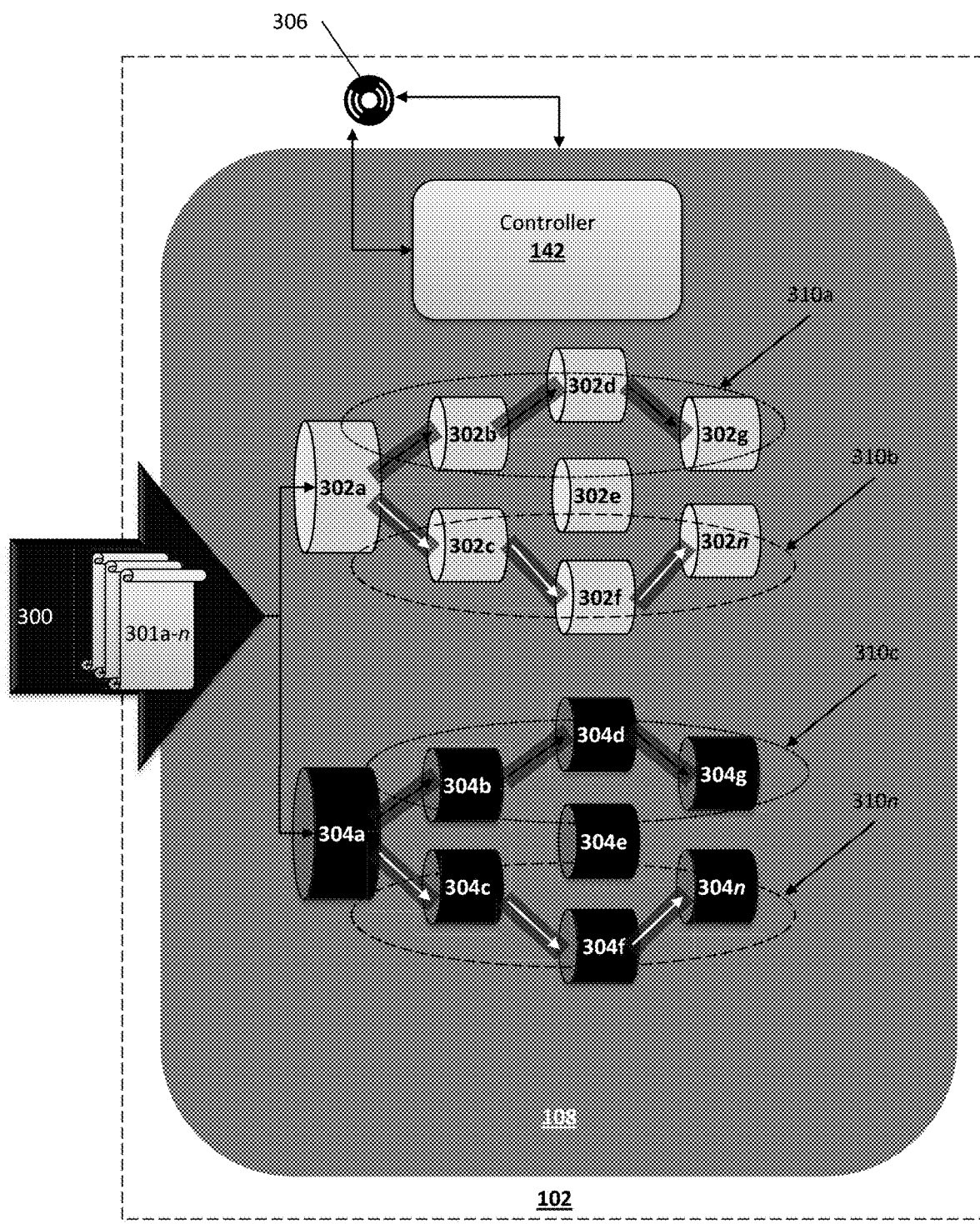
FIG. 3 is a block diagram of one or more input/output (IO) code paths through components of a storage array in accordance with embodiments of the present disclosure.

Regarding FIG. 3, a storage array 102 can include a controller 142 that can determine code paths (e.g., code paths 310a-n) taken by input/output (IO) operations 301 in an IO workload 300. A code path corresponds to a sequence of steps 302a-n and 304a-n that an IO operation (e.g., IO operation 301a) takes through logical and hardware components 108 of a storage array 102. Each IO operation of an IO workload (e.g., the IO workload 300) can follow different branches of execution 310a-n depending on factors such as the type of operation (read or write), the current storage array configuration, and specific conditions encountered during execution.

Figure 5:
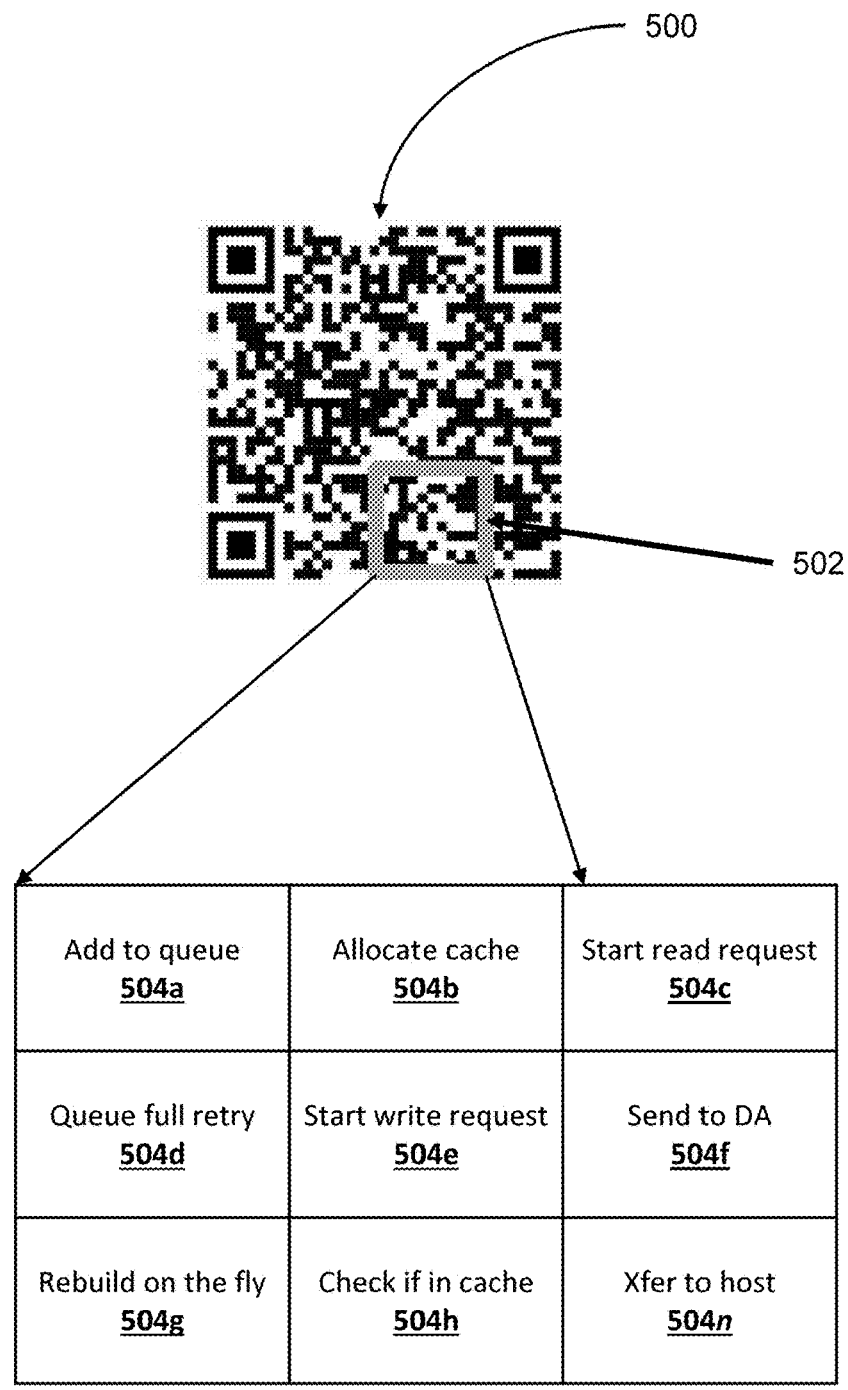
FIG. 5 is a block diagram of a bitmap matrix corresponding to an IO operation in accordance with embodiments of the present disclosure.

In embodiments, the controller 142 can establish a "Tracelet" (e.g., a bitmap matrix (P-matrix) 500 of FIG. 5) for each IO operation 301a-n of an IO workload 300. For example, the controller 142 can set a bit in the bitmap matrix of, e.g., an IO operation 301a corresponding to each step/function 302a-n, 304a-n through the IO operation 301 flows. Thus, the bitmap matrix explains how the IO operation 301a experienced the different processing phases of the storage array's components 108.

In embodiments, the storage array 102 can receive an IO operation 301a from a host (e.g., the host machine 126a of FIG. 1). Upon receiving the IO operation 301a, the controller 142 can engage one or more daemons 306 connected to one or more of the storage array's components 108. Each daemon 306 can be configured to oversee and manage operations related to its designated component 108 of the storage array 102. The daemons 306 can maintain activity logs of the components 108 and determine which steps/functions each component performs on the IO operation 301a-n.

As each IO operation 301a-n progresses, each daemon 306 gathers and relays real-time data concerning the performance and status of its component to the controller 142. This real-time data gathering ensures that the system is always responsive and adaptive. For instance, a disk daemon would monitor the health and activity of disks, while a cache daemon tracks cache usage statistics. This information is continuously fed back to the controller, detailing the interaction of the IO operations 301a-n with each component 108, including paths (e.g., one or more of the code paths 310a-n) taken at the emulation level, caching decisions, data service processes, and final interactions with the storage media.

In embodiments, the controller 142 compiles the data from all the daemons 306 to construct a detailed map (e.g., bitmap matrix 500 of FIG. 5) of the code path traversed by each IO operation. This comprehensive map highlights any encountered bottlenecks, delays, or errors. Additionally, the controller can analyze the paths 310a-n to identify the most optimal paths for various types of IO operations based on criteria such as speed, resource utilization, and error rates. Further, the controller 142 can optimize future IO operations by directing them along these identified paths and adjusting resource allocation or component configurations based on the analysis.

In embodiments, an IO operation (e.g., the IO operation 301b) can include a read request. A host adapter (HA) (e.g., the HA 122) can receive the read request and perform initial processing via, e.g., step 302a of code path 310a. For example, the HA can validate the read request, check for security or access permissions, and route the IO operation 301b to the appropriate component 108 within the storage array 102.

The HA can forward the IO operation 301b to a data services engine (e.g., the EDS 140 of FIG. 1). At step 302b of the code path 310a, the data services engine can check if the requested data of the read request 301b requires special handing such as deduplication, compression, or encryption. For instance, the data services engine can adjust the read operation 301b accordingly, potentially modifying the request to align with how data is stored (e.g., decompressing data). Additionally, the data services engine can check if the requested data is available in a cache slot of global memory (e.g., the GM 128 of FIG. 1).

If a cache hit occurs, the data is quickly retrieved from the cache, significantly speeding up the response time. If a cache miss occurs, the operation 301b proceeds to the disk adapter (DA) (e.g., the DA 136 of FIG. 1). The DA, at step 302d of the code path 310a, can retrieve the requested data from the storage array's physical storage (e.g., the persistent storage 116 of FIG. 1). Once the DA retrieves the data from physical storage, the HA, at step 302g of code path 310, can package the data into a format suitable for transmission back to the requesting host. Additionally, the HA can transmit the data over a network (e.g., the SAN 118 of FIG. 1) to the host, completing the IO operation 301b.

Figure 4:
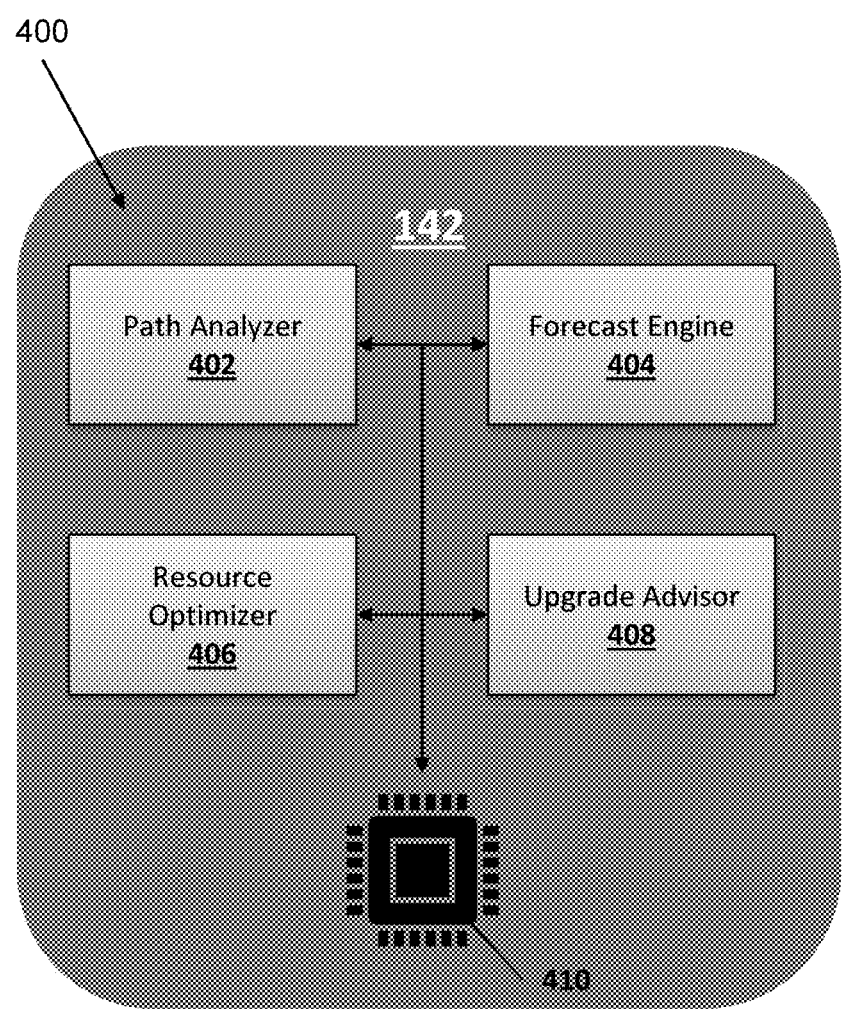
FIG. 4 is a block diagram of a controller in accordance with embodiments of the present disclosure.

Regarding FIG. 4, a storage array (e.g., the storage array 102 of FIGS. 1 and 3) can include controller 142 configured to optimize the performance of the storage array dynamically. For example, the controller 142 can include logic, hardware, and circuitry 400 that optimize the storage array's processing of IO operations (e.g., the IO operations 301a-n of FIG. 3) by dynamically adjusting resources, predicting performance bottlenecks and generating strategic upgrade recommendations based on real-time and historical data analysis.

In embodiments, the controller 142 can include a path analyzer 402 that tracks and records paths (e.g., the code paths 310a-n of FIG. 3) taken by each IO operation across the storage array's components (e.g., the components 108 of FIGS. 1 and 3). In particular, the path analyzer 402 can continuously monitor the IO operations of an IO workload (e.g., the IO operations 301a-n of the IO workload 300 of FIG. 3) received by the storage array. Accordingly, the path analyzer 402 can track the sequence of code path branches (e.g., the code path branches 302a-n and 304a-n of FIG. 3) that each IO operation follows through the storage array's components.

Regarding FIG. 5. the path analyzer 402 of FIG. 4 can use a bitmap matrix 500, known as a P-matrix, to log the code path branches each IO operation takes. Accordingly, the path analyzer updates the bitmap matrix for each IO operation as they are processed. This matrix is structured to record binary data where each bit represents a decision point or branch in the code path of the IO operation. The state of each bit (set or unset) indicates whether a specific path or branch was taken. For example, a bitmap block 502 of the bitmap matrix 500 represents a set of code path branches 504a-n an IO operation can take. Accordingly, a set bit (e.g., dark block) identifies a function of a component that processed an IO operation. Further, an unset bit (e.g., white block) identifies a component function that did not process the IO operation.

Additionally, each bit in the bitmap matrix can be associated with metadata that describes the context of the code path branch, such as the type of operation (read or write), the components involved (e.g., cache, disks), and any relevant performance metrics. This association enriches the raw path data, allowing for more nuanced analysis and understanding. For example, the path analyzer 402 can tag significant events or anomalies detected while processing the IO operations in the bitmap matrix for each IO operation. The events and anomalies can include unusual delays, errors, and the like. Further, the path analyzer can store the bitmap matrix and historical data regarding IO operations and their paths through the storage array in a local memory 410.

Referring back to FIG. 4, the controller 142 can include a forecast engine 404 that predicts future IO operation paths for IO operations targeting each logical storage volume or storage group. The forecast engine 404 can use historical data from bitmap matrices stored in the local memory 410 corresponding to IO operations targeting each storage volume or storage group. For example, the forecast engine 404 can use the collected data for each storage volume or storage group to analyze patterns and trends in IO paths.

Thus, the forecast engine 404 can identify common sequences in the code path branches that frequently lead to bottlenecks or other performance issues. Based on the analysis, the forecast engine 404 can assign probabilities to each potential path an IO operation might take. Based on historical occurrences and trends, these probabilities reflect the likelihood of each path being taken in future operations. The forecast engine 404 can also organize the probabilities into a matrix format, creating a tracelet probability matrix.

Figure 6:
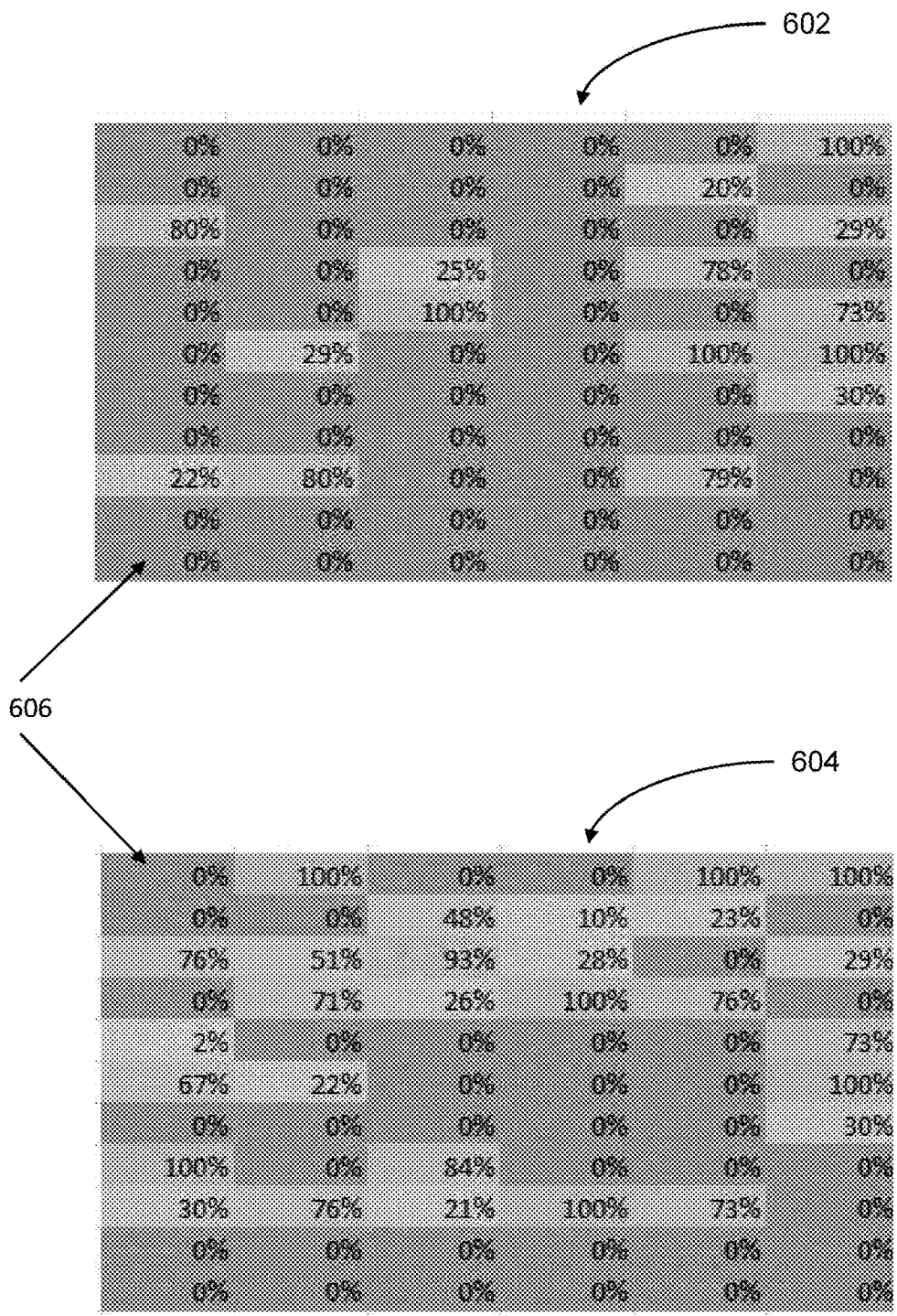
FIG. 6 is a block diagram of tracelet probability matrices in accordance with embodiments of the present disclosure.

Regarding FIG. 6, a tracelet probability matrix 602 can represent probabilities of code path branches taken for IO write operations for a subject storage device or storage group (not shown) within the storage array. Each cell 606 in the matrix 602 corresponds to a specific part of a code path branch and contains a probability value indicating the likelihood of that path being used by future IO operations. As components of the storage array process new IO operations, the forecast engine 404 continuously updates the tracelet probability matrices. This ensures that the predictions remain accurate and reflect the most current operational conditions of the storage array. For example, a tracelet probability matrix 604 can correspond to code path branches taken for IO write operations during peak workloads or when an error has occurred. Accordingly, the forecast engine 404 can compare the two matrices 602/604 to identify potential performance issues and corresponding solutions.

Referring back to FIG. 4, the controller 142 can include a resource optimizer 406 that dynamically adjusts the resources and configurations within the storage array based on the analysis provided by the path analyzer 402 and the forecasts from the forecast engine 404. Thus, the resource optimizer 406 can proactively resolve or mitigate potential performance bottlenecks. For example, the resource optimizer 406 can receive detailed path analysis and bottleneck forecasts from the path analyzer 402 and forecast engine 404 to reallocate resources such as memory, bandwidth, and processing power within the storage array to optimize performance.

In embodiments, the controller 142 can include an upgrade advisor 408 that generates strategic upgrade recommendations to improve system recommendations. For example, the upgrade advisor 408 can analyze data collected by the path analyzer 402, including trends in IO operation paths, frequency of bottlenecks, and overall system performance over time. In addition, the upgrade advisor 408 can receive trend data and forecasts from the forecast engine 404 and use the information to formulate upgrade strategies.

The upgrade advisor 408 can categorize the upgrade recommendations into low, medium, and high-cost tiers. Each recommendation includes a detailed cost-benefit analysis, helping decision-makers understand the financial impact alongside the performance benefits. For instance, the upgrade advisor 408 can obtain configuration data corresponding to the storage array from the local memory 410 to make recommendations tailored to the specific needs and architecture of the storage array. Thus, the upgrade advisor 108 can consider factors like current hardware utilization, historical performance data, and future workload projections to suggest the most appropriate upgrades.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 7:
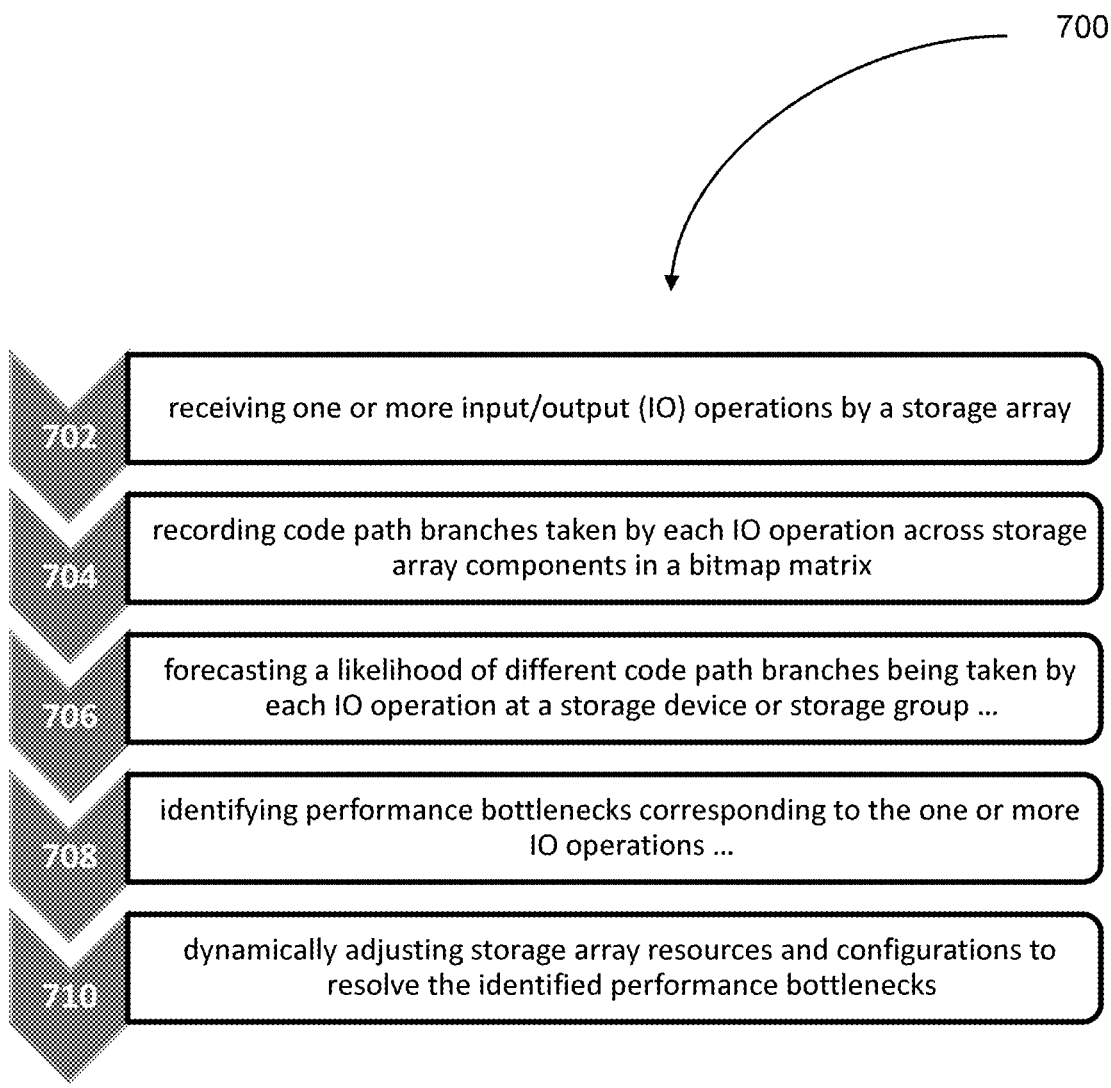
FIG. 7 is a flow diagram of a method for dynamic performance optimization in storage arrays using tracelet matrices per embodiments of the present disclosure.

Regarding FIG. 7, a method 700 relates to dynamic performance optimization in storage arrays using tracelet matrices. In embodiments, the controller 142 of FIG. 1 can perform all or a subset of operations corresponding to the method 400.

For example, the method 700, at 702, can include receiving one or more input/output (IO) operations by a storage array. Additionally, at 704, the method 700 can include recording code path branches taken by each IO operation across storage array components in a bitmap matrix. The method 700, at 706, can also include forecasting a likelihood of different code path branches being taken by each IO operation at a storage device or storage group level using each IO operation's corresponding bitmap matrix. Further, the method 700, at 708, can include identifying performance bottlenecks corresponding to the one or more IO operations based on a comparison of each IO operation's bitmap matrix and forecast of the likelihood of the different code path branches being taken by each IO operation targeting a subject storage device or storage group. Moreover, at 710, the method 700 can include dynamically adjusting storage array resources and configurations to resolve the identified performance bottlenecks.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data.

Additionally, a computer can receive data from or transfer data to one or more mass storage device(s) for storing data (e.g., magnetic, magneto-optical disks, solid-state drives (SSDs), or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving one or more input/output (IO) operations by a storage array;
   recording code path branches taken by each IO operation across storage array components in a bitmap matrix;
   forecasting a likelihood of different code path branches being taken by each IO operation at a storage device or storage group level using each IO operation's corresponding bitmap matrix;
   identifying performance bottlenecks corresponding to the one or more IO operations based on a comparison of each IO operation's bitmap matrix and forecast of the likelihood of the different code path branches being taken by each IO operation targeting a subject storage device or storage group; and
   dynamically adjusting storage array resources and configurations to resolve the identified performance bottlenecks.

2. The method of claim 1, further comprising:
   linking each bit in the bitmap matrix with data describing a distributed event corresponding to a portion of a code path branch taken by each IO operation.

3. The method of claim 1, further comprising:
   generating a probability matrix for each storage device or storage group of the storage array using the forecasted likelihood of the different code path branches being taken by each IO operation.

4. The method of claim 3, further comprising:
   associating each cell of the probability matrix with at least a portion of a code path branch; and
   providing each cell with a probability corresponding to a future IO operation using the at least the portion of the code path branch.

5. The method of claim 4, further comprising:
   generating a tracelet score for each probability matrix based on a sum of each cell's probability in each probability matrix.

6. The method of claim 5, further comprising:
   comparing the tracelet score against one or more performance thresholds; and
   identifying the performance bottleneck based on the comparison.

7. The method of claim 6, further comprising:
   associating each probability matrix with a configuration file corresponding to the storage array, wherein the configuration file identifies hardware and logical resources equipped by the storage array.

8. The method of claim 7, further comprising:
   predicting performance metrics of the storage array based on different IO workloads and storage array configurations using lab-based and field-deployed storage arrays by collecting probability matrix, performance, and configuration data from the lab-based and field-deployed storage arrays.

9. The method of claim 4, further comprising:
masking one or more cells of the probability matrix for each storage device or storage group based on a relative importance of the one or more cells.

10. The method of claim 8, further comprising:
generating upgrade recommendations for the storage array based on the probability matrix for each storage device or storage group, wherein the upgrade recommendations include options categorized into low, medium, and high cost based on a cost factor and performance impact associated with each recommendation.

11. An apparatus with a memory and processor, the apparatus configured to:
receive one or more input/output (IO) operations by a storage array;
record code path branches taken by each IO operation across storage array components in a bitmap matrix;
forecast a likelihood of different code path branches being taken by each IO operation at a storage device or storage group level using each IO operation's corresponding bitmap matrix;
identify performance bottlenecks corresponding to the one or more IO operations based on a comparison of each IO operation's bitmap matrix and forecast of the likelihood of the different code path branches being taken by each IO operation targeting a subject storage device or storage group; and
dynamically adjust storage array resources and configurations to resolve the identified performance bottlenecks.

12. The apparatus of claim 11, further configured to:
link each bit in the bitmap matrix with data describing a distributed event corresponding to a portion of a code path branch taken by each IO operation.

13. The apparatus of claim 11, further configured to:
generate a probability matrix for each storage device or storage group of the storage array using the forecasted likelihood of the different code path branches being taken by each IO operation.

14. The apparatus of claim 13, further configured to:
associate each cell of the probability matrix with at least a portion of a code path branch; and
provide each cell with a probability corresponding to a future IO operation using the at least the portion of the code path branch.

15. The apparatus of claim 14, further configured to:
generate a tracelet score for each probability matrix based on a sum of each cell's probability in each probability matrix.

16. The apparatus of claim 15, further configured to:
compare the tracelet score against one or more performance thresholds; and
identify the performance bottleneck based on the comparison.

17. The apparatus of claim 16, further configured to:
associate each probability matrix with a configuration file corresponding to the storage array, wherein the configuration file identifies hardware and logical resources equipped by the storage array.

18. The apparatus of claim 17, further configured to:
predict performance metrics of the storage array based on different IO workloads and storage array configurations using lab-based and field-deployed storage arrays by collecting probability matrix, performance, and configuration data from the lab-based and field-deployed storage arrays.

19. The apparatus of claim 14, further configured to:
mask one or more cells of the probability matrix for each storage device or storage group based on a relative importance of the one or more cells.

20. The apparatus of claim 18, further configured to:
generate upgrade recommendations for the storage array based on the probability matrix for each storage device or storage group, wherein the upgrade recommendations include options categorized into low, medium, and high cost based on a cost factor and performance impact associated with each recommendation.

* * * * *